United States Patent [19]

Roux

[11] 4,326,334
[45] Apr. 27, 1982

[54] HAND HELD RESTRAINING CUTTER

[76] Inventor: Steven J. Roux, Forge Village Rd., Groton, Mass. 01450

[21] Appl. No.: 186,113

[22] Filed: Sep. 11, 1980

[51] Int. Cl.³ ............................................. B26B 17/00
[52] U.S. Cl. .................................................. 30/124
[58] Field of Search .......................... 30/124, 134, 135

[56] References Cited

U.S. PATENT DOCUMENTS

| 49,178 | 8/1965 | Valentine | 30/134 |
|---|---|---|---|
| 253,252 | 2/1882 | Badia | 30/135 |
| 2,302,810 | 11/1942 | Steegmuller | 30/124 |
| 2,775,032 | 12/1956 | Sorensen | 30/134 |
| 3,763,560 | 10/1973 | Makkay | 30/124 |
| 4,196,514 | 4/1980 | Merriman | 30/124 |

*Primary Examiner*—Jimmy C. Peters
*Attorney, Agent, or Firm*—Henry S. Miller

[57] ABSTRACT

A hand held tool for cutting hard materials such as wire, having a pair of jaws which close around the material to be cut and including a resilient "U" shaped material affixed to the jaws and adapted to roll back while gripping and holding with variable force, one portion of the material cut.

5 Claims, 5 Drawing Figures

HAND HELD RESTRAINING CUTTER

BACKGROUND OF THE INVENTION

This invention relates generally to hand held cutting tools and in particular to such cutting tools that restrain that portion of the material severed during the cutting operation.

Each year, a number of workers are injured in the electronics production field by flying materials such as component leads and wires. The materials are propelled as a result of being cut from electronic components, either being readied for circuit board installation, or during the finishing process after installation. In order to reduce the possibility of injury, workers are required to wear protective clothing and eye protection. In addition to this, work areas are divided by curtains which are designed to stop flying objects.

Another area of difficulty is the loss of these materials in the device itself or other devices, causing short circuiting and other malfunctions.

The problems associated with electronic component manufacture and repair are well known in the art. A number of tools have been made to remedy these problems and reduce the hazards caused by flying objects. Generally, wires are cut by means of hand held cutting pliers. One such tool utilizes a sponge rubber-like substance filling the recessed area of the pliers, with a rough, hard surface plate affixed to each jaw of the cutter whereby a wire is gripped as it is cut. The disadvantage to this approach, is that the plates fail to adapt to irregular surfaces, thereby applying uneven pressure. The plates crush and distort softer materials that are cut, and lose their efficiency when the hard surface begins to wear and becomes smooth. Another device includes simply filling the depression in the pliers with a resilient, unspecified material which clamps around the wire when the jaws close. Depending upon the material, the device requires excessive force on the handles in order to function on heavier wire or wire with insulation. Similarly this device lacks the ability to safely and reliably restrain both large and small wire.

SUMMARY OF THE INVENTION

The tool described in this invention, is an improvement over similar known tools of the prior art. Utilizing a conventional pair of hand held diagonal cutters with or without spring biased handles, the invention provides an improved resilient variable pressure restraining means for gripping material severed by the cutting edges.

The feature considered particularly novel, is the "roll back" aspect of the resilient restraining means. A restraining means of pure gum rubber or other suitable material, being elongated and having a "U" shaped cross section, is affixed to each jaw of the pliers in juxtaposition to the cutting edge. The base of the "U" is positioned along the cutting edge and comes in contact with the material to be cut. The gripping or restraining material is then "rolled back" away from the cutting edge by the wire or other material. This causes the restraining means to apply a variable amount of pressure without creating "excess pressure" when larger material is being cut. The resilient restraining means is affixed to the jaw by an appropriate cement and may be replaced by simply removing the old means and cementing a new means in its place. Similarly, cutting tools not now equipped with the restraining means could be equipped with the means by cementing the appropriate size means to the jaw.

It is therefore an object of the invention to provide a new and improved hand held restraining cutting tool.

It is another object of the invention to provide a new and improved hand held cutting tool with means for restraining the severed section of the work piece.

It is a further object of the invention to provide a new and improved hand held cutting tool with means adapted for restraining the severed section of variable size pieces.

It is still another object of the invention to provide a new and improved hand held restraining cutter tool that has variable pressure restraining means for variable size work pieces.

It is still a further object of the invention to provide a new and improved restraining means for cutting tools that is highly effective and low in cost.

It is another object of the invention to provide a new and improved restraining means for cutting tools that is long lasting and easily replaceable.

These and other advantages, features and objects of the invention will become more apparent from the following description with the illustrative embodiment in the accompanying drawing.

DESCRIPTION OF THE PREFERRED EMBODIMENT

Figure 1:
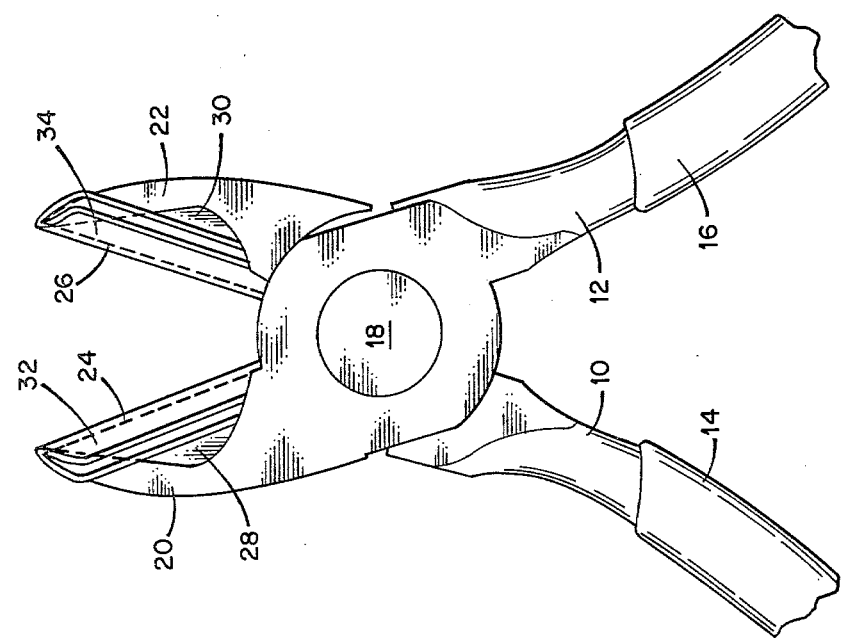
FIG. 1 is an elevation view of the invention in the open position.

Referring now to FIG. 1, handles of a conventional diagonal cutter are shown at 10 and 12. The handles might be covered with insulative material 14 and 16. The handles pivot about a common pin 18 and form jaws 20, 22. Each jaw has a cutting edge 24, 26 formed by shaping the inside edge of the jaw into a recessed area at 28 and 30.

Within the recessed area of the jaws and along each cutting edge, is a resilient restraining means 32, 34. Each restraining means is in the cross section shape of a "U" and extends along the cutting edge from the tip to the base of the edge, near the pivot point. One side of the "U" shaped restraining means is affixed to the jaw by an appropriate cement such as Super Bond, manufactured by the Loctite Corp.

Figure 3:
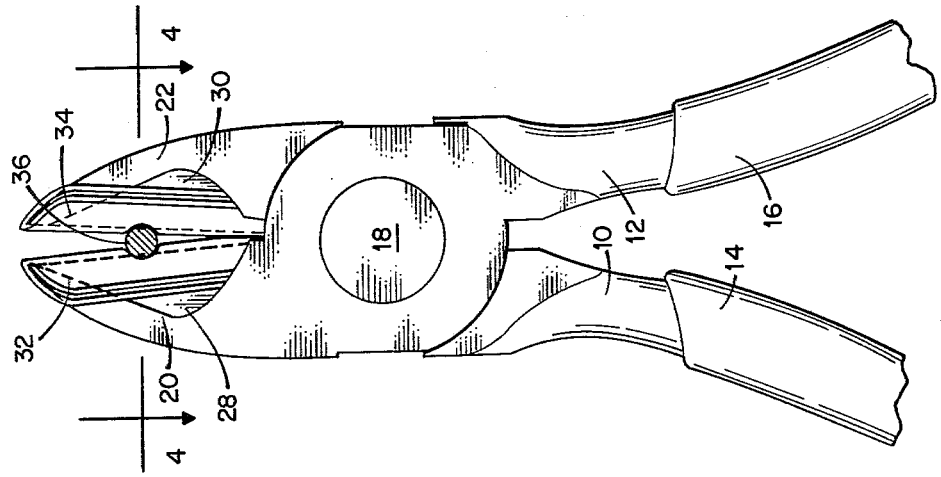
FIG. 3 is an elevation view of the invention with the restraining means gripping the work piece.
Figure 2:
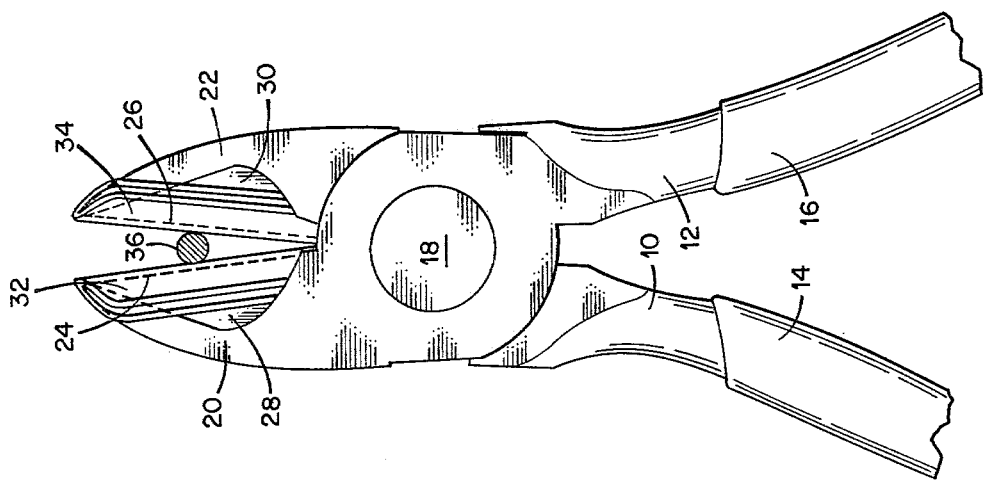
FIG. 2 is a front elevation view of the invention with jaws partly closed.

Concerning FIGS. 2 and 3, a work piece 36 of, for example, wire, is introduced between cutting edges 24, 26 of the jaws and restraining means 32, 34 grasp work piece 36 and begin to roll back (FIG. 3) applying varying pressure to the work piece as the jaws are closed. The pressure varies depending upon the size of the work piece.

It should be noted however, that regardless of the pressure exerted upon the work piece by the restraining means, no damage will occur to the work piece.

Figure 4:
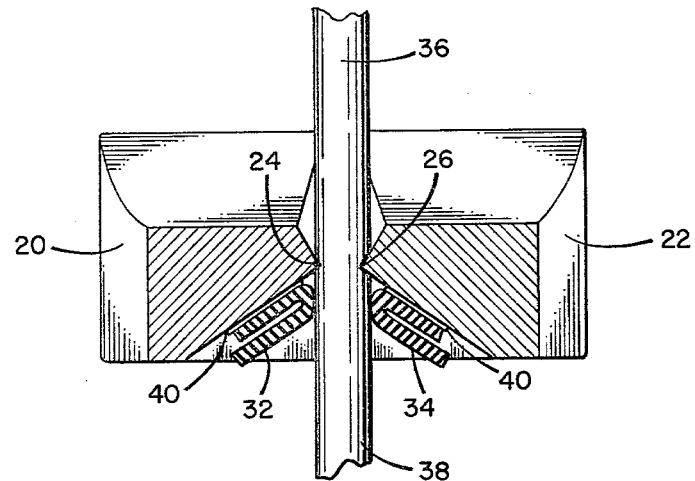
FIG. 4 is a section taken along lines 4—4 of FIG. 3.

FIG. 4 shows a sectional view of the invention with jaws 20, 22 gripping work piece 36 by the cutting edges 24 and 26. Resilient restrainers 32, 34 have been rolled back and grasp the soon to be severed end 38. The resilient means are held to the jaws by adhesive 40.

Figure 5:
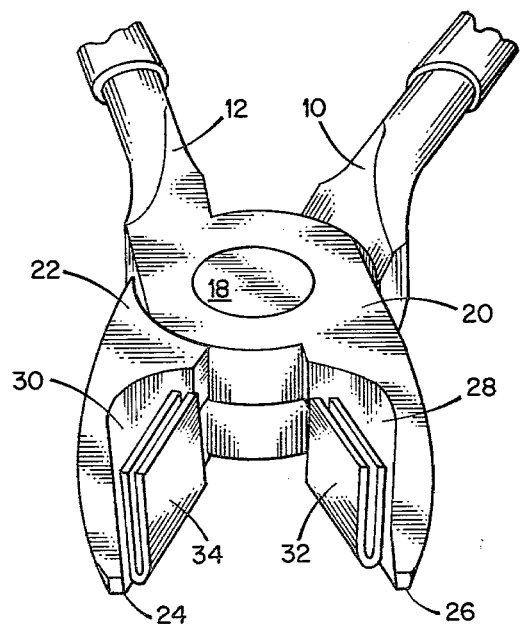
FIG. 5 is a perspective view of the invention showing the restraining means positioned on the cutting jaws.

With regard to FIG. 5, the resilient restraining means extend the entire length of the cutting edge and simply roll back as they touch the work piece. At first, the resilient means collapses slightly to conform to the shape of the work piece. Then, as the jaws close, the restraining means rolls back as more pressure is applied to the work piece. The restraining means finally reaches its limit of elasticity and begins to pull against the cement affixing the means to the jaw. Before the restraining means is pulled free from the jaw, the work piece will be severed and held by the restraining means.

As can be easily seen from the Figures, the larger the work piece, the further the restraining means will roll back. Conversely, the smaller the work piece, the less the restraining means will roll back. Because of this feature then, large wire can be restrained while being severed without hampering the cutting operation of the cutters, and by the same principle small wire may also be properly restrained.

It should be noted that the restraining means requires no significant additional force to be applied to the handles of the cutting tool while closing the jaws.

The invention is shown with diagonal cutting pliers, but is not limited thereto and may be readily adaptable to other hand held cutting tools.

Although the invention has been described with reference to a particular embodiment, it will be understood by those skilled in the art that the invention is capable of a variety of alternative embodiments within the spirit and scope of the appended claims.

I claim:

1. In a hand held cutting tool including: a pair of lever arms, pivotally connected about a point near one end, providing opposing handles on the longer end from the pivot point, and a pair of jaws on the shorter end from the pivot point, each jaw connected to one of said pair of lever arms: a cutting edge on each of said jaws, positioned to mate with the cutting edge on the other said jaw, with said jaws in a closed position, the improvement comprising;

a pair of resilient, work restraining members, each member being "U" shaped in cross section having one side affixed to one of said jaws; with the other side free to move, and extending parallel to and in juxtaposition with the cutting edge, wherein the base of one member abutts the base of the other member when the jaws are in the closed position, and said members adapted to roll back from the cutting edge upon application of a force caused by a workpiece being placed between the cutting edges and the jaws moved to the closed position.

2. A hand held cutting tool according to claim 1 wherein said resilient member is formed of pure gum rubber.

3. A hand held cutting tool according to claim 2 wherein said resilient member is affixed to the jaws with Super Bond cement.

4. A hand held cutting tool according to claim 3 wherein the surface of each said jaw along said cutting edge on said jaw extends angularly outwardly from said cutting edge to the next surface forming a recessed area in the surface of the jaws opposite from the cutting edges.

5. A hand held cutting tool according to claim 4 wherein said cutting tool is diagonal wire cutting pliers.

* * * * *